(12) United States Patent
Pross et al.

(10) Patent No.: US 6,396,466 B1
(45) Date of Patent: May 28, 2002

(54) OPTICAL VEHICLE DISPLAY

(75) Inventors: Gerhard Pross, Weil im Schoenbuch; Jens-Peter Seher, Stuttgart; Markus Maile, Boeblingen, all of (DE)

(73) Assignee: Agilent Technologies, Palo Alto, CA (US)

( * ) Notice: Subject to any disclaimer, the term of this patent is extended or adjusted under 35 U.S.C. 154(b) by 0 days.

(21) Appl. No.: 09/452,609

(22) Filed: Dec. 1, 1999

(30) Foreign Application Priority Data

Dec. 3, 1998 (EP) .............................................. 98123113
Sep. 8, 1999 (EP) .............................................. 99117635

(51) Int. Cl.$^7$ ................................................. G09G 3/32
(52) U.S. Cl. ........................ 345/82; 340/468; 340/815.4
(58) Field of Search .............................. 345/82, 83, 39, 345/40, 44, 690, 691; 340/815.4, 525, 479, 468, 469; 303/7

(56) References Cited

U.S. PATENT DOCUMENTS

| | | | | |
|---|---|---|---|---|
| 5,896,084 A | * | 4/1999 | Weiss et al. ................. | 340/468 |
| 6,014,119 A | * | 1/2000 | Staring et al. ................ | 345/82 |
| 6,023,259 A | * | 2/2000 | Howard et al. ............... | 345/82 |
| 6,179,390 B1 | * | 6/2001 | Guzorek et al. ............... | 303/7 |

* cited by examiner

*Primary Examiner*—Xiao Wu

(57) ABSTRACT

Optical vehicle display having a set of LEDs arranged in a matrix and having a control circuit which acts as a controllable current source and as controllable voltage source, so that a constant current can be applied for each LED and the respective voltage is established accordingly. An optical vehicle display designed in this way permits a design as a taillight, brake light, flashing indicator and the like in a motor vehicle with favorable production at the same time due to reduced faulty assembly and simple adjustment of the light values.

8 Claims, 2 Drawing Sheets

OPTICAL VEHICLE DISPLAY

Figure 1:
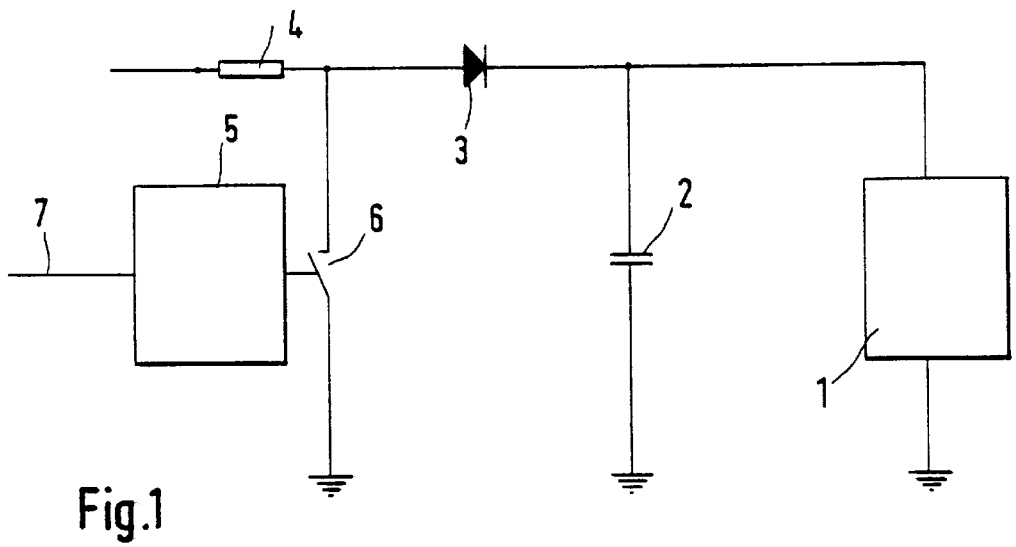

The invention relates to an optical vehicle display with a set of LEDs connected in series and/or in parallel, where the set of LEDs is connected to control circuit means.

Such optical vehicle displays are known as the additional third brake light on passenger vehicles, where the LEDs are connected in a parallel connection of n series connections with a maximum of three to four LEDs or as a matrix circuit in a series connection of a maximum of three to four parallel connections of n LEDs of the same forward voltage class. To set the current, the LEDs are provided with series resistors, where the resistance values are selected as a function of the forward voltage class of the respective LEDs.

It would essentially be advantageous to also use LEDs for implementation of the incandescent bulbs used in the past, especially for taillights, brake lights, back-up lights, flashing indicators, etc. on automobiles. Disadvantages of incandescent bulbs include the fact that they have a poor efficiency and a limited lifetime; corresponding colors (wavelengths) must be implemented with additional filters which produce additional losses; incandescent bulbs are bulky and therefore a shallow design adapted to the shape of the vehicle is impossible; due to the limited lifetime, it is necessary to use lamp sockets that permit a simple replacement and thus also take up additional space in the vehicle; incandescent bulbs have a delayed turn-on response, which is manifested especially in braking operations; and brightness control of incandescent bulbs with direct voltage is possible only with loss resistance and thus with corresponding heating.

In comparison with these disadvantages of incandescent bulbs in the automotive area, LEDs have a long lifetime and permit space savings due to the small flat design and the possibility of the three-dimensional arrangement of the lighting elements, for example, in the trunk area of a passenger vehicle. In addition, different colors are possible since a light spot of any color can be produced with a mixture of red, green and blue LEDs, or LEDs with different colors. Due to the possibility of rapid turn on, they present an increased safety aspect, especially when used as a brake light, lengthening the stopping distance for the following automobile by approximately five meters when traveling at a speed of 120 km/hr, for example, because it is possible to detect the leading car's braking action sooner. In addition, LEDs have a high shock resistance and vibration resistance as well as a lower inherent temperature. The power required to produce the same brightness is lower by a factor of 4 to 5.

Nevertheless, in implementation of LEDs, especially for brake lights and taillights, with the possible implementations available in the past there has been a high power consumption, which is converted almost completely into heat at resistors and semiconductor components (typically 3 to 5 watts). This evolution of heat in conjunction with temperatures occurring in the vehicle can lead to an unacceptably high chip temperature of more than 125° C. under conventional installation conditions. Therefore, to prevent additional heat problems with the LED brake lights known in the past, the number of LEDs per light is preferably selected as an integral multiple of 3 or 4. The arrangement of resistors and/or semiconductor components on the LED circuitboard represents an additional thermal stress for the LEDs. Another problem for mass production of such lights is the different forward voltage classes of the LEDs because a mixed assembly is impossible especially with the above-mentioned matrix circuit with a series connection of a maximum of 3 to 4 parallel connections of n LEDs in the same forward voltage class. Consequently, several different forward voltage classes must be processed for each light project, which leads to an undesirable variety of variants. With the series resistors used in the past, the working point of the LEDs can be set only for one voltage value of the on-board voltage in the vehicle, so that the wide distribution of the forward voltages of an LED within one class always leads to a blurred setting of the working point in the case of a resistance circuit. Superpositioning of several tolerances (reflector quality, geometric tolerances, band width of the brightness classes, resistance tolerances, band width of the forward voltage classes, transmittance of the light disk and the optically effective elements) can lead on the whole to a wide scattering of the light values in mass production.

The object of the present invention is therefore to propose an optical vehicle display that overcomes the disadvantages mentioned above and is suitable for installation as a signal lamp in a motor vehicle in particular.

This object is achieved by means of an optical vehicle display having the features of the main claim. Additional advantageous embodiments are given in the subclaims.

According to this invention, the set of LEDs has a matrix of LEDs, where the matrix consists at least of one column of at least one LED, with the LEDs in the column connected in series and the columns connected in parallel. Each column of the LED matrix is connected to first control circuit means which act as a controllable current source, and the set of LEDs is connected to second control circuit means which act as a voltage source for adjusting the voltage across the LEDs as a function of the current set. This arrangement results in constant current operation in each column, i.e., in each LED branch, so this eliminates the division of different classes of forward voltages, and different forward voltage classes can be arranged in one branch. Therefore, this reduces the variety of variants in assembly as well as the danger of faulty assembly. The constant current yields an accurate working setting of the LEDs. Since no resistors are necessary to adjust the individual LEDs, this eliminates the corresponding production of heat at the resistors. The number of LEDs can be selected freely, i.e., no gradation in multiples of 3 or 4 is necessary. On the whole, this yields a lower total power consumption by the system.

The column given in the definition of the matrix is one LED or a series connection of several LEDs in each column. Several columns or branches can be connected in parallel. In this connection, the term row could also be used instead of the term column for the arrangement of LEDs (depending on the angle of observation).

The first control circuit means have a corresponding number of current sources, depending on the number of LEDs and the arrangement either all in rows or with several columns connected in parallel with LEDs connected in series. By means of the controllable current sources, the desired brightness can be set by setting the current. The second control circuit means, controlled by the first control circuit means, automatically set the proper voltage needed, depending on the circuit arrangement and the current set. Thus, the voltage must be adjusted upward by the second control circuit means in comparison with the voltage supplied by the vehicle wiring system when using only one column with a plurality of LEDs in series, whereas the voltage is reduced with an arrangement of several parallel columns with a few LEDs. In addition, the combination of upwards and downwards conversion is possible.

To achieve a minimal power consumption, the lowest possible voltage required for proper functioning of the LEDs is set by means of the second control circuit means. According to a preferred embodiment, the control circuit means contain logic circuit means; programming and setting of the constant current sources takes place over these logic circuit means. The voltage in the second control circuit means is set for example by a dc-dc converter with pulse width modulation (PWM).

In the event of failure of one or more LEDs, either the entire display may fail, depending on the arrangement, or further operation may be allowed, assuming corresponding brightness values. According to another embodiment, the logic circuit means delivers a signal in either case, providing an indication that a replacement is necessary or compensation is possible.

Especially for production of the complete optical vehicle displays, it is necessary in final inspection to compensate for manufacturing tolerances and to set different brightness classes at the same light value. For this reason the first control circuit means have settings and/or control means with which it is possible to set the current flowing through the LED externally. An example for such a setting and/or control means could be a photo detector which measures the ambient light in order to properly set the LED current. A proper setting of the LED current may compensate for different daylights or weather conditions.

In another embodiment means to define the temperature are supplied which are connected to the logic circuit means. For example, the temperature can be defined by measuring the forward voltage of one or more LEDs, so that by controlling the LED current the maximum junction temperature will never be exceeded.

According to another embodiment, the logic circuit means switch the LEDs on and off in a cycle with a frequency that is invisible to the human eye to adjust the brightness in day and night operation and to turn a tail light into a stop light and vice versa. This measure provides a uniform load on the LEDs with regard to their lifetime.

The first and second circuit means and the logic circuit means may be arranged either in the area of the lights in the vehicle, in the plug connector to the respective light or in the area of the central control electronics of the vehicle.

Figure 2:
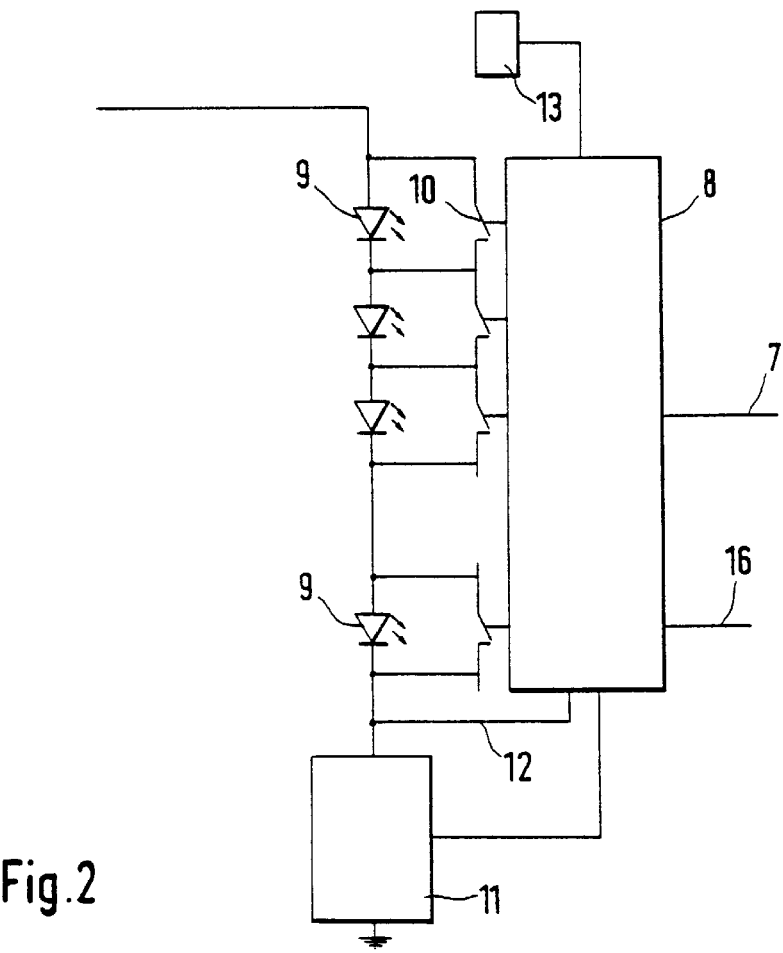
Figure 3:
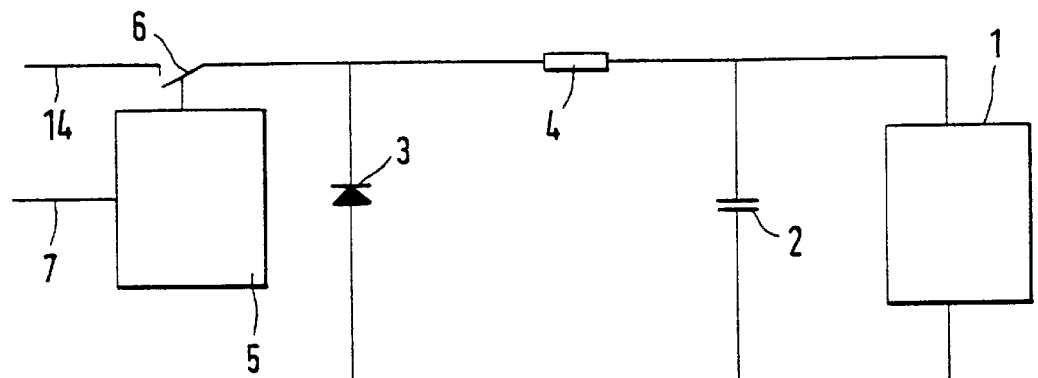
Figure 4:
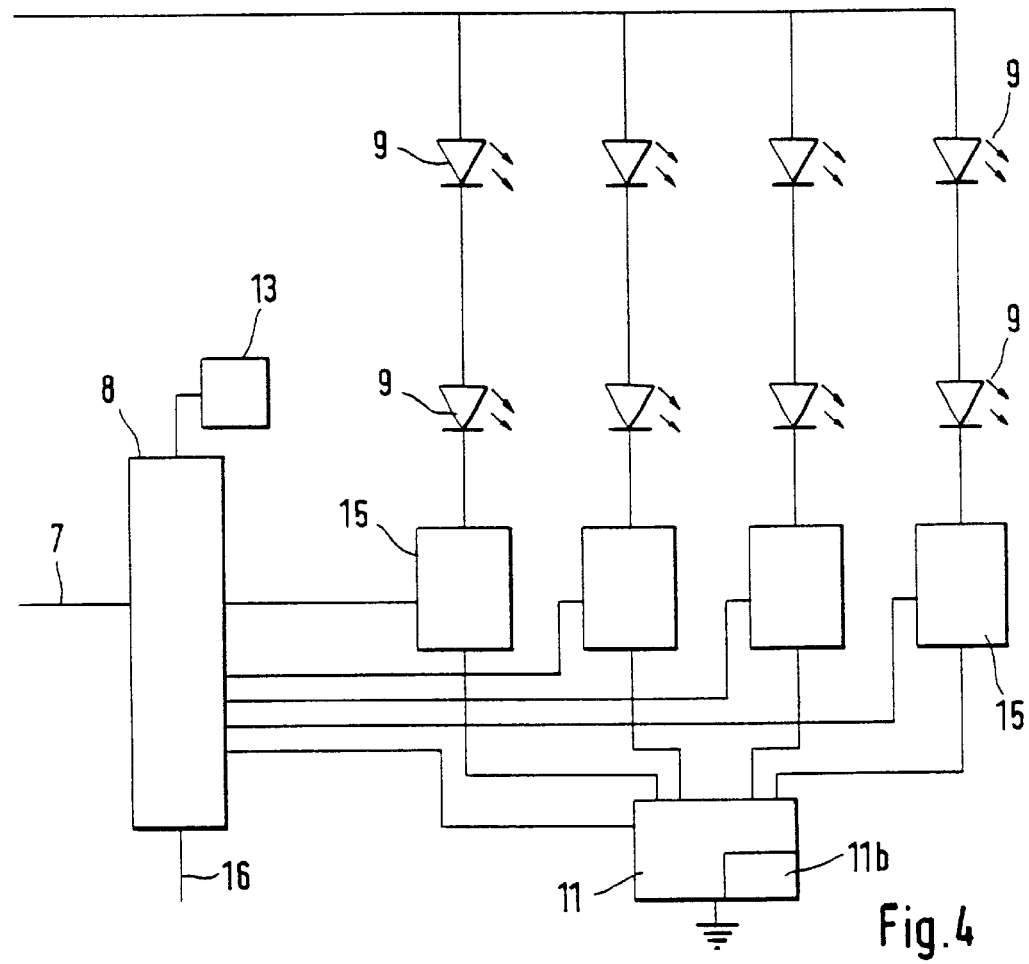

The invention is explained in greater detail below in conjunction with the figures, which show:

FIG. 1: the basic circuit arrangement for a load with LEDs connected only in series;

FIG. 2: the circuit arrangement for the load in FIG. 1;

FIG. 3: the basic circuit arrangement for a load with several parallel connected column arrangements of LEDs; and FIG. 4: the circuit arrangement for the load according to the basic circuit in FIG. 3.

The basic circuit shown in FIG. 1 shows the arrangement of a parallel connection of load 1 and capacitor 2. This parallel connection is itself connected to the signal triggering source, e.g., at a central location (not shown) by way of a series connection of diode 3 and coil 4. A control circuit 5 is connected between coil 4 and diode 3 and is connected in parallel to diode 3, capacitor 2 and load 1. Control circuit 5 sets the voltage required for operation of load 1 by pulse width modulation by means of switch 6. Control circuit 5 is connected by line 7 to logic circuit 8 shown in FIG. 2.

FIG. 2 shows the structure of load 1 from FIG. 1 with a plurality of series connected LEDs 9. For example, the known high-performance LEDs can be used as LEDs. Essentially, however, it is also possible for three LEDs with the colors red, green and blue together to form one light point and produce the desired color for the light by appropriate triggering. As FIG. 2 shows, each LED can be short-circuited over a switch 10, so that in the event of a failure of one LED, the other LEDs may continue to operate by short-circuiting the corresponding LED by means of logic circuit 8, or dimming of the LEDs can be performed by short-cutting the LEDs by means of circular variation. Another control circuit 11 which is connected to logic circuit 8 is connected in series with LEDs 9. Logic circuit 8 is also connected by line 12 to the input of control circuit 11. A constant current through the LEDs is set as current adjust by means of logic circuit 8 via control circuit 11 and sensing circuit 11b, regardless of how many LEDs 9 are in operation. No separate current source is necessary because control circuit 5 sets the voltage for only one branch of series connected LEDs 9 as representative of all series connected LEDs 9 as a function of control circuit 11 and the set current. In this embodiment, the voltage across all the LEDs must be adjusted upward to 60 volts, for example, in comparison with a lower on-board voltage of 12 volts or 20 volts, for example, due to the series connection of the LEDs. Logic circuit 8 is also connected to a means 13 to measure the forward voltage of one or several LEDs, to be able to regulate the current by means of control circuit 11 as a function of the temperature.

In the basic circuit according to FIG. 3, the same elements are labeled with the same reference numbers. In comparison with the basic circuit according to FIG. 1, coil 4 is connected here in series with the parallel connection of capacitor 2 and load 1 because of the modified design of the load. Diode 3 is arranged parallel to this series connection in the blocking direction. Just as in the previous example, the voltage on the load is set on the basis of the current with control circuit 5 and the respective switch 6 which is operated by pulse width modulation in signal line 14.

FIG. 4 shows the design of the load and shows several parallel connected columns of LEDs 9 connected in series, where each series connection is assigned to a current source which is connected to a logic circuit 8. Logic circuit 8 is connected to control circuit 5 over line 7. A constant current in each branch is guaranteed by means of current sources 15 because of the parallel connection of the individual LED branches 9, so the constant currents are applied by means of current sources 15 which are connected to control circuit 11, which control circuit includes an ambient light sensing circuit 11b. In the embodiment according to FIGS. 3 and 4, control circuit 5 is set at a lower voltage, e.g., 8.5 volt, than the on-board vehicle network due to the parallel connection of individual LED columns. In both embodiments, the current range required for the desired brightness is programmed with the appropriate factors, taking into account the manufacturing tolerances. The respective voltage is then established as a function of the applied current, where control circuit 5 is always set at the lowest required voltage for optimum operation of the LEDs.

Terminal 16 on logic circuit means 8 is used for external setting and programming of the desired and required constant currents, e.g., at the end of the band, to compensate for production tolerances or for setting identical light values in different brightness classes of LEDs 9. Failure of individual LEDs 9 can be reported to a central location over an additional line (not shown).

What is claimed is:

1. An optical vehicle display having a set of LEDs connected to a first logic circuit, said optical vehicle display comprising:

a matrix of LEDs including said set of LEDs having at least one column of at least one LED, with said at least one LED in said at least one column being connected in series, wherein each of said at least one columns are connected in parallel;

first control circuit, connected to said at least one column, which acts as a controllable current source to produce a set current through said at least one column; and second control circuit, connected to said matrix of LEDs, which acts as a voltage source for adjusting a voltage across said matrix of LEDs as a function of said set current.

2. An optical vehicle display according to claim 1, wherein said second control circuit establishes a lowest possible voltage required for proper functioning of the LEDs with minimal power consumption.

3. An optical vehicle display according to claim 1, wherein said first control circuit includes a second logic circuit which is connected to said second control circuit.

4. An optical vehicle display according to claim 1, wherein said voltage across said matrix of LEDs is set in the second control circuit by pulse width modulation.

5. An optical vehicle display according to claim 1, wherein said first logic circuit delivers a signal when one or more LEDs fail.

6. An optical vehicle display according to claim 1, wherein said first control circuit has connection means and control means for setting current through said LEDs dependent on an ambient light and/or ambient condition.

7. An optical vehicle display according to claim 1, further comprising a measuring device to measure a forward voltage of at least one LED in order to set the set current such that a junction temperature of said at least one LED is below the maximum allowed.

8. An optical display device according to claim 1, wherein said first logic circuit switches said LEDs cyclically at a frequency that is not visible to the human eye to set the brightness in day and night operation.

* * * * *